United States Patent
Chewins et al.

(10) Patent No.: US 12,246,804 B2
(45) Date of Patent: Mar. 11, 2025

(54) REMOVABLE CONTAINMENT BOOM ANCHOR

(71) Applicants: Elliott Chewins, Toronto (CA); Aaron William Miller, Brampton (CA)

(72) Inventors: Elliott Chewins, Toronto (CA); Aaron William Miller, Brampton (CA)

(*) Notice: Subject to any disclaimer, the term of this patent is extended or adjusted under 35 U.S.C. 154(b) by 475 days.

(21) Appl. No.: 17/403,563

(22) Filed: Aug. 16, 2021

(65) Prior Publication Data

US 2023/0046898 A1 Feb. 16, 2023

(51) Int. Cl.
| | |
|---|---|
| *E02B 15/06* | (2006.01) |
| *B63B 35/32* | (2006.01) |
| *H01F 7/02* | (2006.01) |
| *E02B 15/00* | (2006.01) |

(52) U.S. Cl.
CPC ............ *B63B 35/32* (2013.01); *H01F 7/02* (2013.01); *E02B 15/00* (2013.01)

(58) Field of Classification Search
CPC .. E02B 15/00; E02B 15/0885; E02B 15/0814; E02B 15/06; E02B 15/0828; E02B 15/085; Y10S 210/923; Y02A 20/204; B63B 35/32; H01F 7/02; H01F 7/0221
See application file for complete search history.

(56) References Cited

U.S. PATENT DOCUMENTS

| | | | | |
|---|---|---|---|---|
| 3,224,141 A * | 12/1965 | Borak | ................. | F41B 7/08 446/160 |
| 3,358,838 A * | 12/1967 | Kosar | ................. | B01D 17/0202 210/776 |
| 3,618,137 A * | 11/1971 | Bassett | ................. | B43L 13/022 33/DIG. 1 |
| 3,657,119 A * | 4/1972 | Turbeville | ................. | B03C 1/01 210/695 |
| 3,753,492 A * | 8/1973 | Aiello | ................. | E02B 15/106 210/776 |
| 3,756,294 A * | 9/1973 | Rainey | ................. | B63B 25/082 210/923 |
| 3,824,514 A * | 7/1974 | Hojnacki | ................. | H01F 7/20 335/213 |
| 3,925,991 A * | 12/1975 | Poche | ................. | E02B 15/085 405/71 |
| 3,938,263 A * | 2/1976 | Tate | ................. | B43L 1/008 40/426 |
| 3,982,334 A * | 9/1976 | Tate | ................. | G02B 26/026 434/409 |
| 4,148,260 A * | 4/1979 | Minovitch | ................. | B60L 13/04 104/138.1 |

(Continued)

FOREIGN PATENT DOCUMENTS

| | | |
|---|---|---|
| GB | 2542419 | 3/2017 |
| KR | 101733958 | 5/2017 |

OTHER PUBLICATIONS

Search Report and Opinion issued Apr. 5, 2023 in respect of counterpart European Patent Application No. 22190644.9.

*Primary Examiner* — Edwin J Toledo-Duran (57) ABSTRACT

A removable containment boom anchor includes: an anchor support having a flexible body fabricated of at least one resilient material, and a containment boom connector fastened to the anchor support. The flexible body has a base and a tab extending from the base. The flexible body encapsulates a plurality of permanent magnets.

17 Claims, 7 Drawing Sheets

(56) References Cited

U.S. PATENT DOCUMENTS

| | | | | |
|---|---|---|---|---|
| 4,235,711 A * | 11/1980 | Koblanski | | E02B 15/04 210/801 |
| 4,243,529 A * | 1/1981 | Strauss | | E02B 15/106 210/242.1 |
| 4,249,834 A * | 2/1981 | Bouvier | | E02B 15/0864 114/240 R |
| 4,273,650 A * | 6/1981 | Solomon | | B09C 1/002 210/104 |
| 4,348,136 A * | 9/1982 | Donovan | | E02B 15/0835 405/65 |
| 4,626,132 A * | 12/1986 | Allen | | E02B 15/0814 405/71 |
| 5,032,212 A * | 7/1991 | Campbell | | E02B 15/0864 405/63 |
| 5,056,958 A * | 10/1991 | Campbell | | E02B 15/0814 405/63 |
| 5,087,152 A * | 2/1992 | Whidden | | E02B 15/0814 210/776 |
| 5,167,815 A * | 12/1992 | Bachmann | | B01D 17/0214 210/923 |
| 5,328,296 A * | 7/1994 | Lahar | | B63B 25/082 405/63 |
| 5,378,371 A * | 1/1995 | Hobson | | B01D 17/0214 210/691 |
| 5,522,334 A * | 6/1996 | Chu | | B63B 25/082 114/74 R |
| 5,688,075 A * | 11/1997 | Gradek | | E02B 15/0885 405/63 |
| 6,575,401 B1 * | 6/2003 | Carver | | B64D 27/24 244/23 C |
| 6,655,872 B1 | 12/2003 | Johnson | | |
| 10,181,781 B2 * | 1/2019 | Pérez Díaz | | H02K 49/043 |
| 10,210,975 B1 * | 2/2019 | Ji | | H01F 7/0205 |
| 11,421,645 B1 * | 8/2022 | Suddaby | | F03B 13/20 |
| 2006/0104720 A1 * | 5/2006 | Haski | | E04H 4/1272 405/60 |
| 2007/0052302 A1 * | 3/2007 | Cheung | | B82Y 25/00 310/12.25 |
| 2009/0123233 A1 * | 5/2009 | Herzogenrath | | B63B 21/02 405/60 |
| 2009/0311047 A1 * | 12/2009 | Martin | | E02B 15/08 405/63 |
| 2011/0031431 A1 * | 2/2011 | Hull | | H01F 7/0221 252/62.51 R |
| 2011/0043063 A1 * | 2/2011 | Weeber | | C23C 30/00 335/297 |
| 2011/0049109 A1 * | 3/2011 | Weeber | | C23C 30/00 228/178 |
| 2011/0056437 A1 * | 3/2011 | Sprung | | A01K 63/006 119/51.04 |
| 2011/0108492 A1 * | 5/2011 | Martin | | E02B 15/06 210/170.03 |
| 2011/0110721 A1 * | 5/2011 | Martin | | E02B 15/085 405/63 |
| 2013/0333905 A1 * | 12/2013 | Binder | | H02K 33/12 173/176 |
| 2015/0048018 A1 * | 2/2015 | Mori | | E02B 15/106 210/242.3 |
| 2015/0162155 A1 * | 6/2015 | Hampton | | F16K 31/0668 335/223 |
| 2017/0215402 A1 * | 8/2017 | Bertrand | | A01M 1/12 |
| 2017/0233966 A1 * | 8/2017 | Ben Eliyahu | | E02B 15/0878 405/60 |
| 2017/0323715 A1 | 11/2017 | Chewins | | |
| 2018/0340307 A1 * | 11/2018 | Zlotkin | | C02F 1/00 |
| 2019/0337822 A1 * | 11/2019 | Warner | | B03C 1/01 |
| 2020/0074970 A1 * | 3/2020 | Suitor | | G10H 3/183 |
| 2020/0208368 A1 * | 7/2020 | Milanovich | | E02B 15/10 |
| 2020/0336840 A1 * | 10/2020 | Zhang | | H01F 7/081 |
| 2021/0078209 A1 * | 3/2021 | Milanovich | | B29B 17/02 |
| 2021/0078210 A1 * | 3/2021 | Milanovich | | B03C 1/035 |
| 2021/0214055 A1 * | 7/2021 | Maydanik | | E02B 15/046 |
| 2022/0099245 A1 * | 3/2022 | Cooper | | F16M 13/02 |
| 2022/0159937 A1 * | 5/2022 | Schmidt | | B01D 29/085 |
| 2023/0047236 A1 * | 2/2023 | Helland | | E02B 15/0814 |

\* cited by examiner

REMOVABLE CONTAINMENT BOOM ANCHOR

FIELD OF THE INVENTION

The present invention relates generally to fluid containment, and in particular to a removable containment boom anchor.

BACKGROUND OF THE INVENTION

In the field of maritime transport, containment booms are temporary floating barriers used to contain spills of floating pollutants, such as oil spills. A containment boom can be used to prevent the floating pollutant from reaching a shoreline, where it can otherwise cause harm to shore ecosystems. A containment boom can also be used to corral a floating pollutant to a smaller area, where it can be more easily removed from the water surface by a suitable method such as skimming, suction, and the like.

As spills of floating pollutants typically result from accidents, containment booms generally need to be installed at the site of the spill as rapidly as possible in order to prevent the size of the spill from becoming too large to contain, and/or to prevent the spill from reaching a shoreline.

Containment booms have been described. For example, U.S. Pat. No. 5,087,152 to Whidden describes a boom that includes a plurality of boom sections joined end to end. Each boom section includes two or more parallel inflatable chambers that are joined with a weighted curtain which is reinforced for strength. Boom sections are stored compactly on respective reels. A substantial number of reels are arranged compactly in the hold of a carrier vessel which is smaller in size and has greater speed and maneuverability than vessels carrying known oil spill containment systems. Boom sections are consecutively unwound from their respective reels and connected end-to-end as they are deployed to form a continuous boom. The boom sections unwind naturally from the reels as the carrier vessel moves through the water away from a tender vessel holding the first end of the boom. The boom's deployment is controlled by a brake on an idler roller and a hydraulic crane's drive wheel on the reel, thus limiting manual handling to lighter-weight tasks. The carrier vessel, or, preferably, the tender vessel inflates the chambers of the boom sections as they are deployed. The system is self-contained, as the carrier vessel is adapted to carry the tender vessel on its aft deck, releasing it when arriving at the spill site.

Connectors for containment booms have also been described. For example, U.S. Pat. No. 6,655,872 to Johnson describes a method, system, and device for deploying an oil spill containment boom at the side of a ship, barge, or other steel structure. Each end of the boom is connected to its own device that is configured to attach to a generally vertical surface of a steel-hulled ship. Attachment occurs through the use of magnetic force. Instead of encircling the entire ship with a boom, the device permits the establishment of specific containment areas around the ship. The device engages and disengage the side of the ship through the use of a cam and lever assembly to counter the magnetic force.

Improvements are generally desired. It is therefore an object at least to provide a novel removable containment boom anchor.

SUMMARY OF THE INVENTION

In one aspect, there is provided a removable containment boom anchor, comprising: an anchor support comprising a flexible body fabricated of at least one resilient material, the flexible body having a base and a tab extending from the base, the flexible body encapsulating a plurality of permanent magnets; and a containment boom connector fastened to the anchor support.

The permanent magnets may be disposed within the base. The containment boom connector may be fastened to the tab.

The flexible body may have a single, unitary structure. The flexible body may be formed by a single casting.

The removable containment boom anchor may further comprise a reinforcement sheet encapsulated within the flexible body. The reinforcement sheet may extend from the base into the tab. The reinforcement sheet may comprise a partial loop that extends generally the height of the tab. The reinforcement sheet may be selected from the group consisting of fiberglass cloth, Kevlar cloth, Kevlar mesh, and a resilient fabric or a resilient mesh fabricated of one or more other materials. The removable containment boom anchor may further comprise first and second reinforcement sheets encapsulated within the flexible body, the first reinforcement sheet being disposed between the plurality of permanent magnets and a first face of the base, the second reinforcement sheet being disposed between the plurality of permanent magnets and second face of the base.

The removable containment boom anchor may further comprise at least one reinforcement grid encapsulated within the flexible body. The at least one reinforcement grid may comprise a wire mesh.

The removable containment boom anchor may further comprise a handle fastened to the anchor support.

The flexible body may have a face comprising a textured surface. The textured surface may have a non-planar topography.

The plurality of permanent magnets may comprise one or more rare earth magnets. Each of the permanent magnets may comprise an epoxy coating. Each of the permanent magnets may comprise a magnet body and ferromagnetic plate. The ferromagnetic plate may be a steel disc.

The at least one resilient material may comprise a polymer. The flexible body may be fabricated of polyurethane.

BRIEF DESCRIPTION OF THE DRAWINGS

Embodiments will now be described more fully with reference to the accompanying drawings in which.

DETAILED DESCRIPTION OF THE EMBODIMENTS

Figure 1:
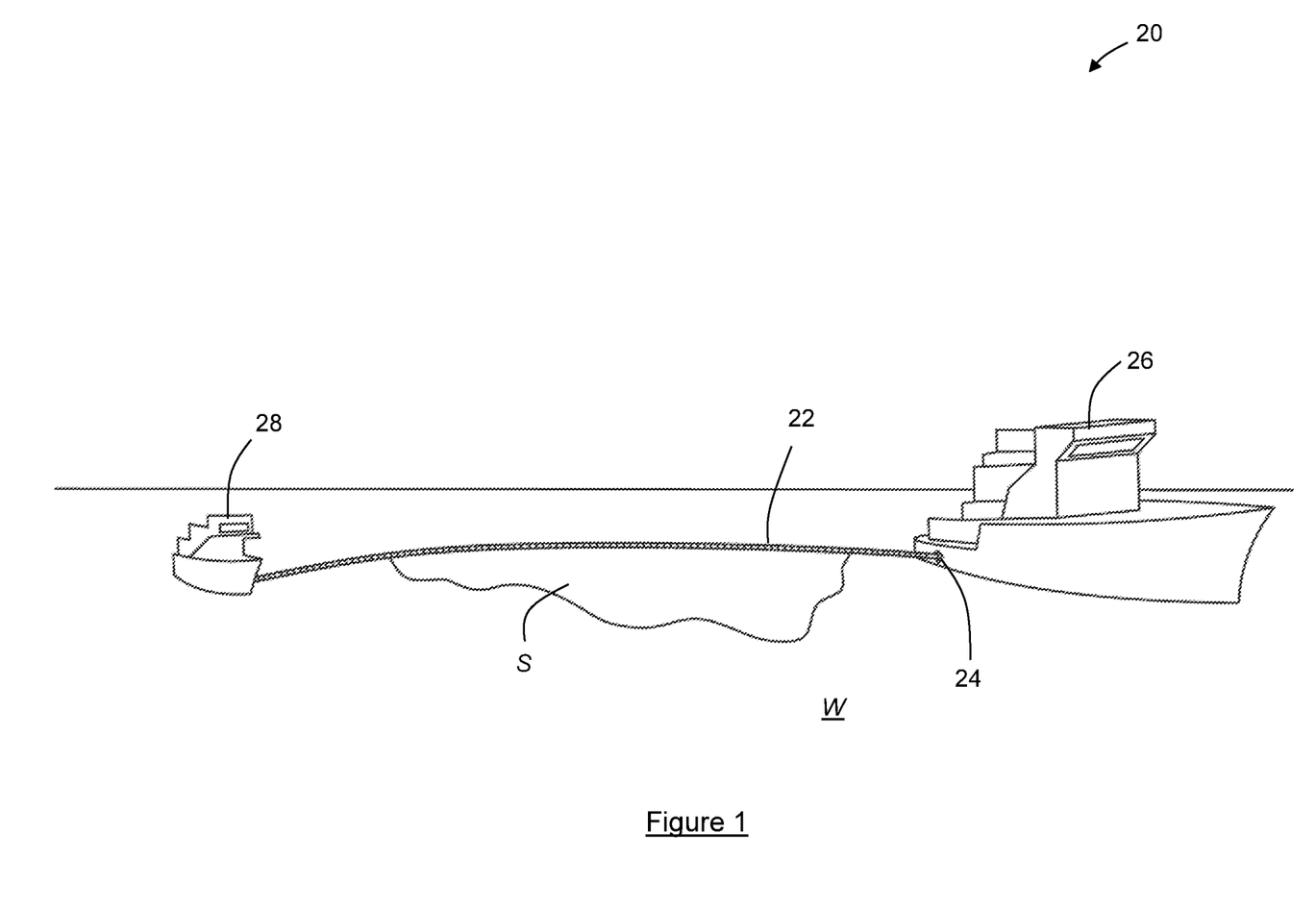
FIG. 1 is a perspective view of a containment boom, in use.

Turning now to FIG. 1 a containment boom is shown in use, and is generally indicated by reference numeral 20.

Containment boom 20 is configured to provide a temporary floating barrier to contain a floating pollutant, such as an oil spill, a quantity of floating debris, and the like. Containment boom 20 comprises a boom string 22 comprising a series of connected, floating boom segments, with each end of the boom string 22 being connected to a removable containment boom anchor 24. The removable containment boom anchor 24 is configured to be removably attached to a ferrous structure, namely a structure that comprises or that is fabricated of steel or other ferrous material, by magnetic force of attraction. In the example shown, the boom string 22 is being towed along the water surface W by a first boat 26 and a second boat 28 to generally contain an oil spill S, with a first end of the boom string 22 removably attached to the steel hull of the first boat 26 by a removable containment boom anchor 24, and with a second end of the boom string 22 removably attached (not shown) to the steel hull of the second boat 28 by another removable containment boom anchor 24.

Figure 2:
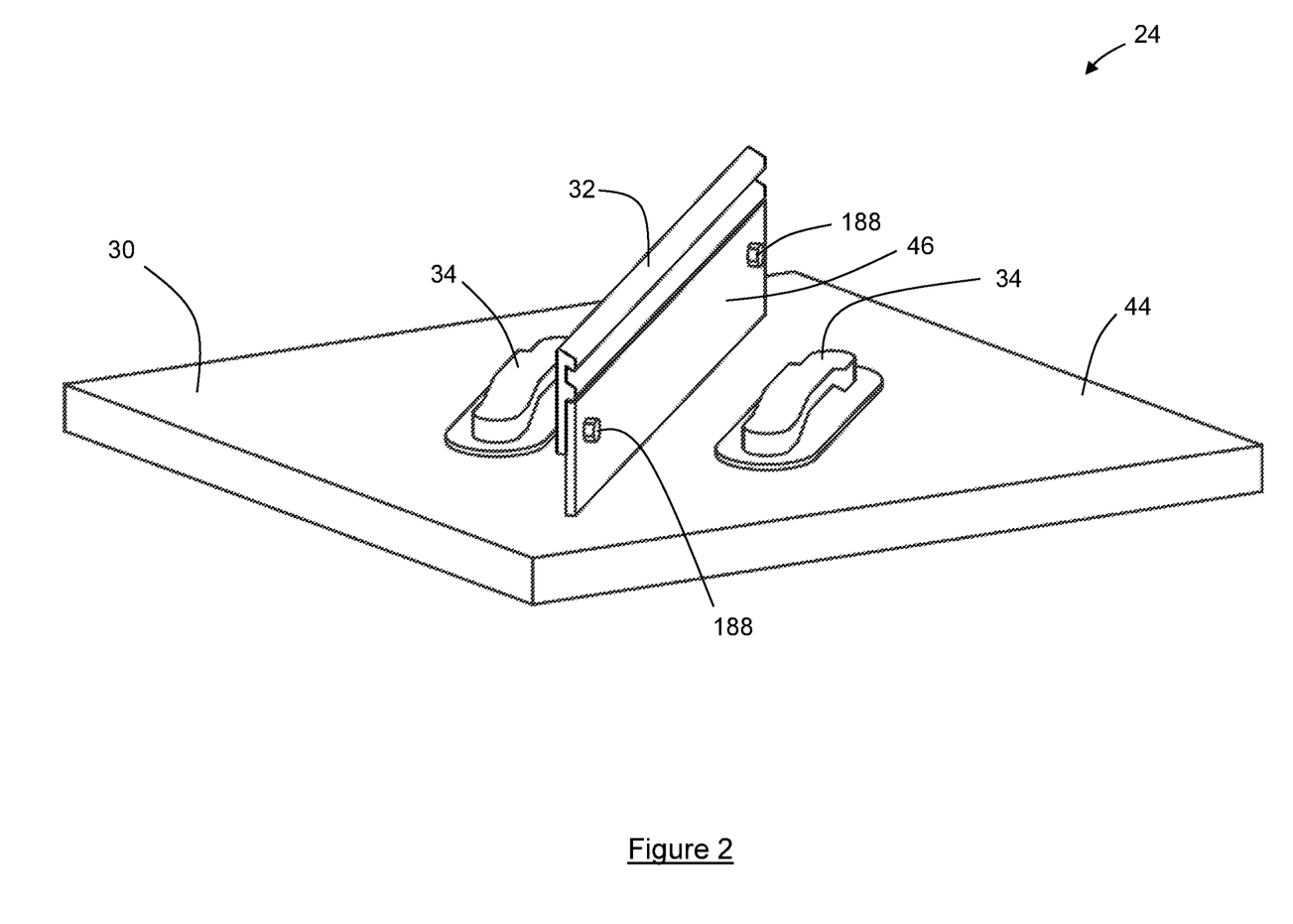
FIG. 2 is a perspective view of a removable containment boom anchor, forming part of the containment boom of FIG. 1.

The removable containment boom anchor 24 may be better seen in FIG. 2. The removable containment boom anchor 24 is configured to be magnetically fastened to a ferrous structure to provide a connection point for the boom string 22. The removable containment boom anchor 24 comprises an anchor support 30, a connector 32 fastened to the anchor support 30, and one or more handles 34 fastened to the anchor support 30.

Figure 3:
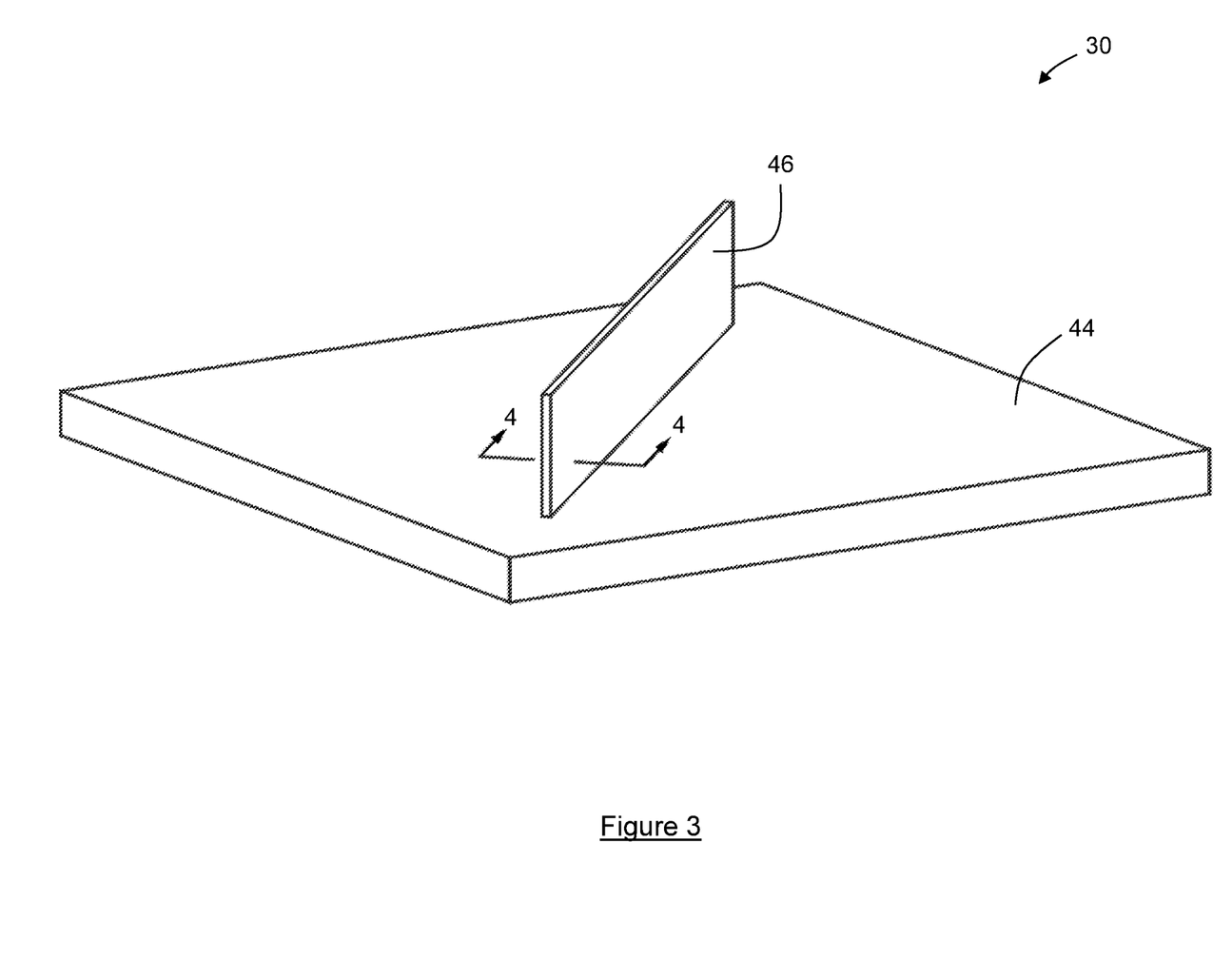
FIG. 3 is a perspective view of an anchor support forming part of the removable containment boom anchor of FIG. 2.
Figure 4:
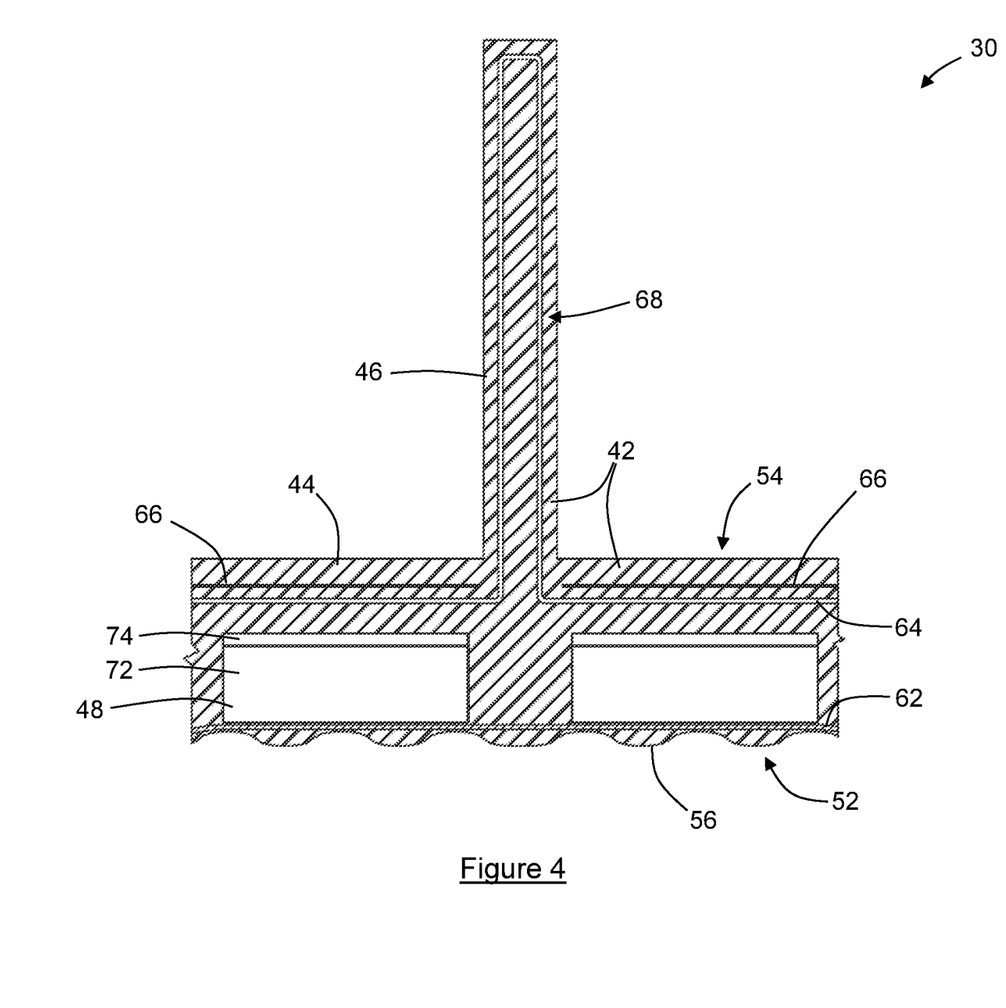
FIG. 4 is a sectional view of a portion of the anchor support of FIG. 3, taken along the indicated section line.

The anchor support 30 may be better seen in FIGS. 3 and 4. The anchor support 30 has an "inverted T-shape", and comprises a flexible body 42 that is fabricated of one or more resilient materials and that has a base 44 and a tab 46 that extends from the base 44. The flexible body 42 encapsulates a plurality of permanent magnets 48 and reinforcement elements, described below. In particular, the flexible body 42 has a single, continuous and unitary structure formed by casting. During casting, the base 44 and the tab 46 are formed together, and the permanent magnets 48, together with reinforcement elements described below, are encapsulated and are thereby enclosed in the flexible body 42. In this embodiment, the flexible body 42 is fabricated of polyurethane, and is formed by a single casting to define the single, continuous and unitary structure.

In the example shown, the base 44 has a generally square shape, and has dimensions of about thirty (30) inches×about thirty (30) inches×about one-half (0.5) inches, and the tab 46 has dimensions of about thirty-eight (38) inches×about eight (8) inches×about one-quarter (0.25) inches. The base 44 has two opposing faces, namely a first face 52 and a second face 54. At least a portion of the first face 52 comprises a textured surface 56, which is formed by casting the flexible body 42 against a textured plate 58 during fabrication, as described below.

The permanent magnets 48 are encapsulated within the flexible body 42 generally adjacent the first face 52 of the base 44. In this embodiment, the flexible body 42 also encapsulates a first reinforcement sheet 62, a second reinforcement sheet 64, and at least one wire reinforcement grid 66. The first reinforcement sheet 62 is disposed within the flexible body 42 between the permanent magnets 48 and the first face 52. The second reinforcement sheet 64 is disposed within the flexible body 42 between the permanent magnets 48 and the second face 54, and is loosely gathered to define a partial loop 68 that extends generally the height of the tab 46. The first and second reinforcement sheets 62 and 64 are each fabricated of a flexible, resilient material, and are configured to provide reinforcement to the flexible body 42 for strengthening the removable containment boom anchor 24. In this embodiment, the reinforcement sheets 62 and 64 are each fabricated of fiberglass cloth. The first reinforcement sheet 62 is separated from the first face 52 by a thin layer of the one or more resilient materials of which the flexible body 42 is fabricated, as may be seen in FIG. 4. Similarly, the permanent magnets 48 are separated from the reinforcement sheet 62 by a thin layer of the one or more resilient materials of which the flexible body 42 is fabricated, as may be seen in FIG. 4.

The wire reinforcement grid 66 is disposed within the flexible body 42 between the second reinforcement sheet 64 and the second face 54. Each wire reinforcement grid 66 is fabricated of a steel wire mesh. In the example shown, there are two (2) wire reinforcement grids 66 disposed within the flexible body 42, with each wire reinforcement grid 66 having a triangular shape and being disposed on either side of the partial loop 68 of the second reinforcement sheet 64.

In the example shown, each permanent magnet 44 is disc shaped, and comprises a rare earth magnet body 72 fabricated of an alloy comprising one or more rare earth elements. Rare earth magnets are known to have a high magnetic strength, and more specifically a high energy product. As a result, the array of permanent magnets 48 enables the removable containment boom anchor 24 to be very strongly magnetically fastened to ferrous structures. Each permanent magnet 44 may be, for example, a grade N42 neodymium iron boron magnet.

Each permanent magnet 44 also comprises a ferromagnetic disc 74 that is magnetically fastened to the magnet body 72. It has been found by the inventor that the ferromagnetic disc 74 increases the magnetic force of attraction of the permanent magnet 44, and thereby increases the magnetic force of attraction of the removable containment boom anchor 24 to the steel structure. In this embodiment, the ferromagnetic disc 74 is fabricated of a ferromagnetic material, such as steel, for example. Each permanent magnet 44 further comprises a thin epoxy coating 74 disposed on the outer surfaces of the magnet body 72 and the ferromagnetic disc 74, such that the epoxy coating 74 encapsulates the permanent magnet 44. As will be understood, the epoxy coating 74 increases the strength of the interface between the permanent magnet 44 and the one or more resilient materials of which the flexible body 42 is fabricated.

Figures 5, 6, 7:
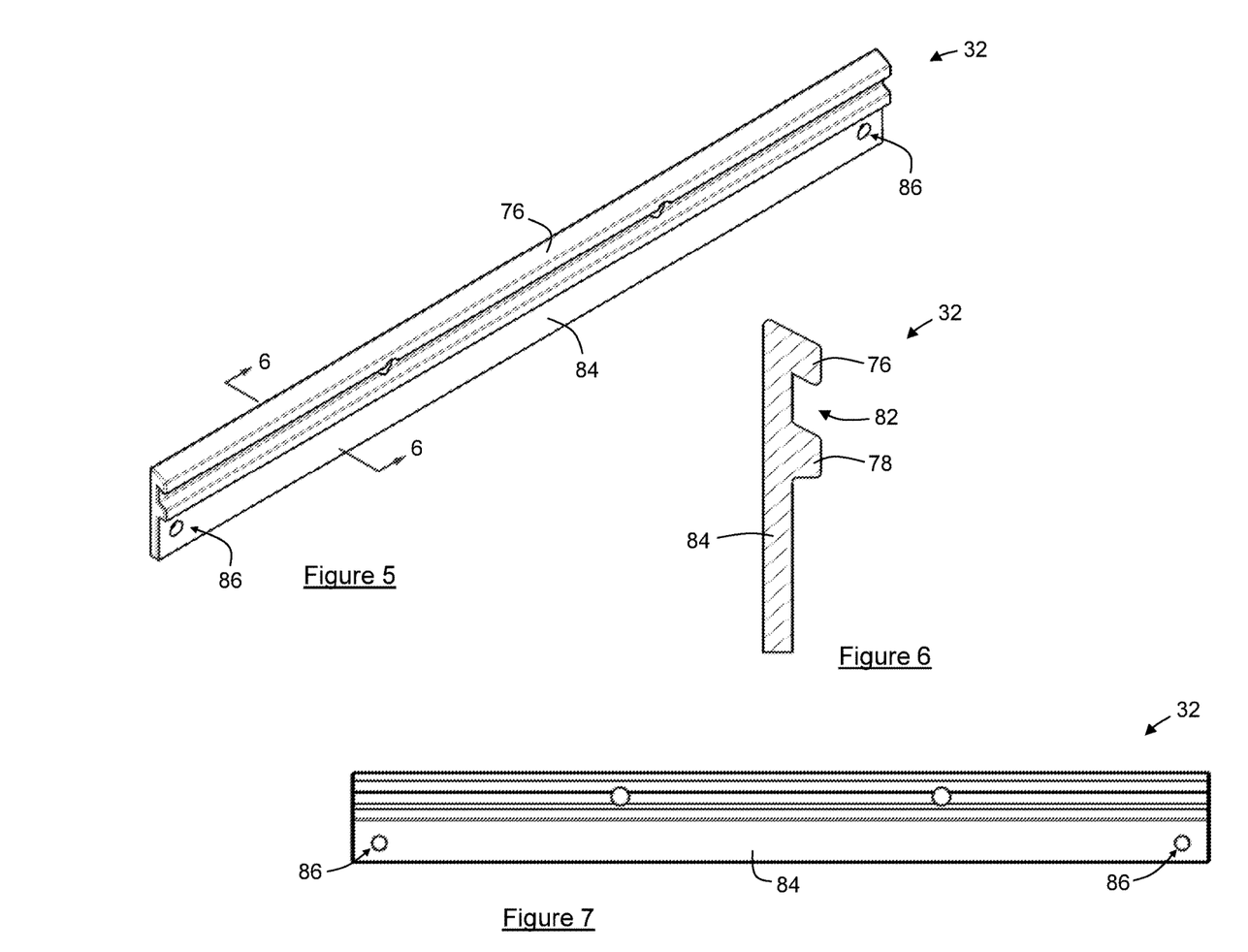
FIG. 5 is a perspective view of a connector forming part of the removable containment boom anchor of FIG. 2.
FIG. 6 is a sectional view of the connector of FIG. 5, taken along the indicated section line.
FIG. 7 is a side view of the connector of FIG. 5.

The connector 32 may be better seen in FIGS. 5 to 7. Connector 32 is generally of the "slide connector" type, and is configured to slidably and matingly engage another connector (not shown) connected to the boom string 22. In the example shown, the connector 32 has a configuration that complies with ASTM International standard F2438-04, "Standard Specification for Oil Spill Response Boom Connection: Slide Connector", and comprises a first longitudinal tab 76, and a second longitudinal tab 78 spaced from the first longitudinal tab 76 so as to define a channel 82 therebetween. As will be understood, the channel 82 is shaped to matingly receive a first longitudinal tab 76 of another connector (not shown) of similar configuration, such as another connector 32. The connector 32 further comprises a flange 84 having a plurality of boreholes 86 defined therein. Each borehole 86 is sized to accommodate a fastener (not shown), such as a bolt, for fastening the connector 32 to the tab 46 of the anchor support 30.

Turning again to FIG. 2, the removable containment boom anchor 24 has at least one handle 34 fastened to the anchor support 30, for enabling the removable containment boom anchor to be more easily carried before and after use, and for facilitating separation of the removable containment boom anchor 24 from the ferrous structure after use. Each handle 34 is fastened to the second face 54 of the anchor support 30 by an adhesive layer (not shown) disposed therebetween. The handle 34 may be a plastic boat grab handle, for example. In the example shown, the removable containment boom anchor 24 has two (2) handles 34 fastened to the anchor support 30.

Figure 8:
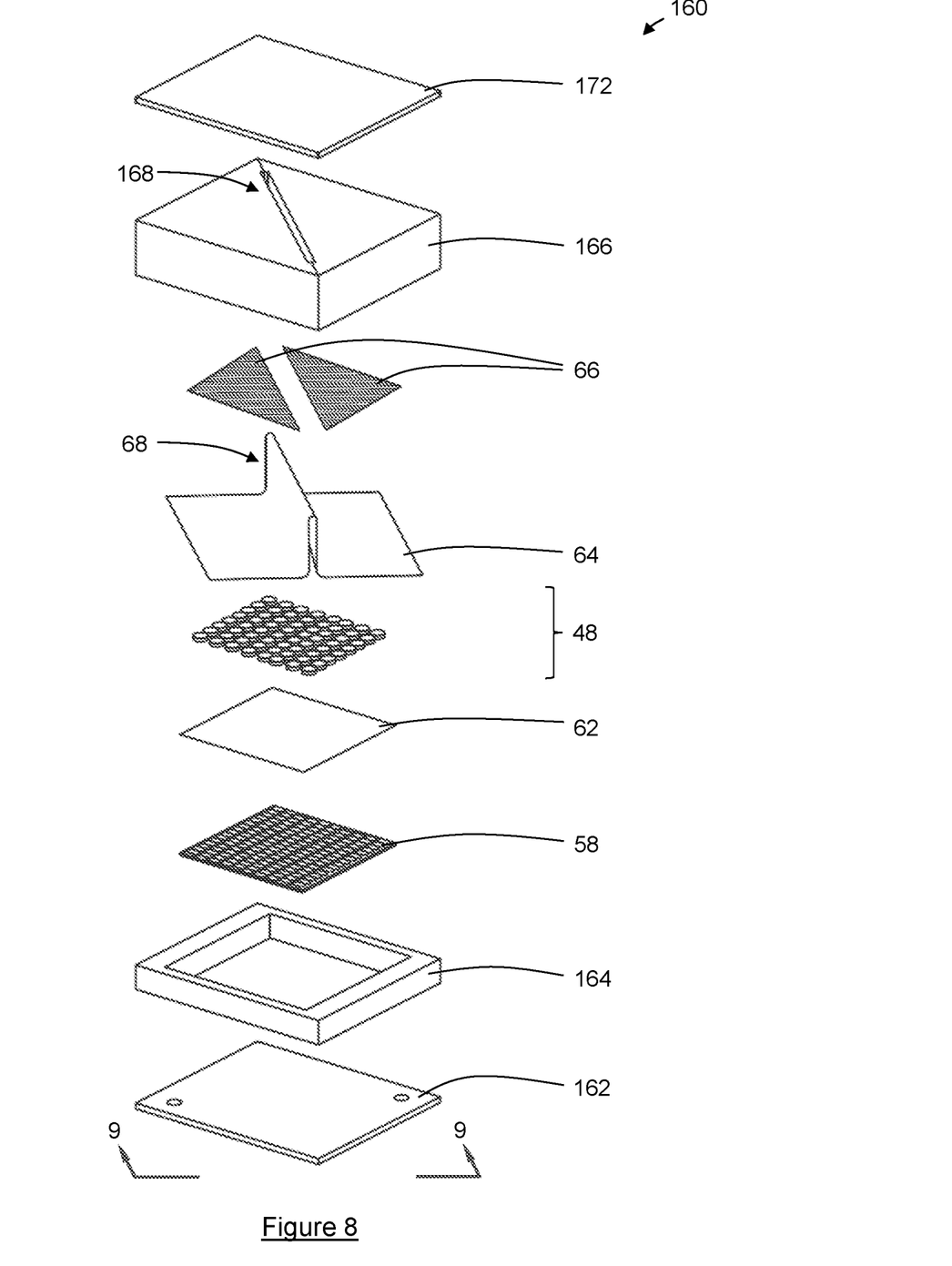
FIG. 8 is an exploded view of a portion of an assembly used to fabricate the anchor support of FIG. 3.

FIG. 8 shows a portion of an assembly 160 used to fabricate the anchor support 30. The assembly comprises a first face plate 162 fabricated of a ferromagnetic material, a base spacer frame 164, a tab spacer frame 166 having a rectangular aperture 168 defined therethrough, and a second face plate 172. In this embodiment, the first face plate 162 is fabricated of steel. The first face plate 162, the base spacer frame 164, the tab spacer frame 166, and the second face plate 172, when assembled, define a mold cavity 180 for fabricating the anchor support 30. The first face plate 162 has a first aperture 182, through which liquid polymer resin used to fabricate the flexible body 42 is delivered, and a second aperture 184, through which air displaced by the liquid polymer resin flowing through the mold cavity 180 is vented.

Figure 9:
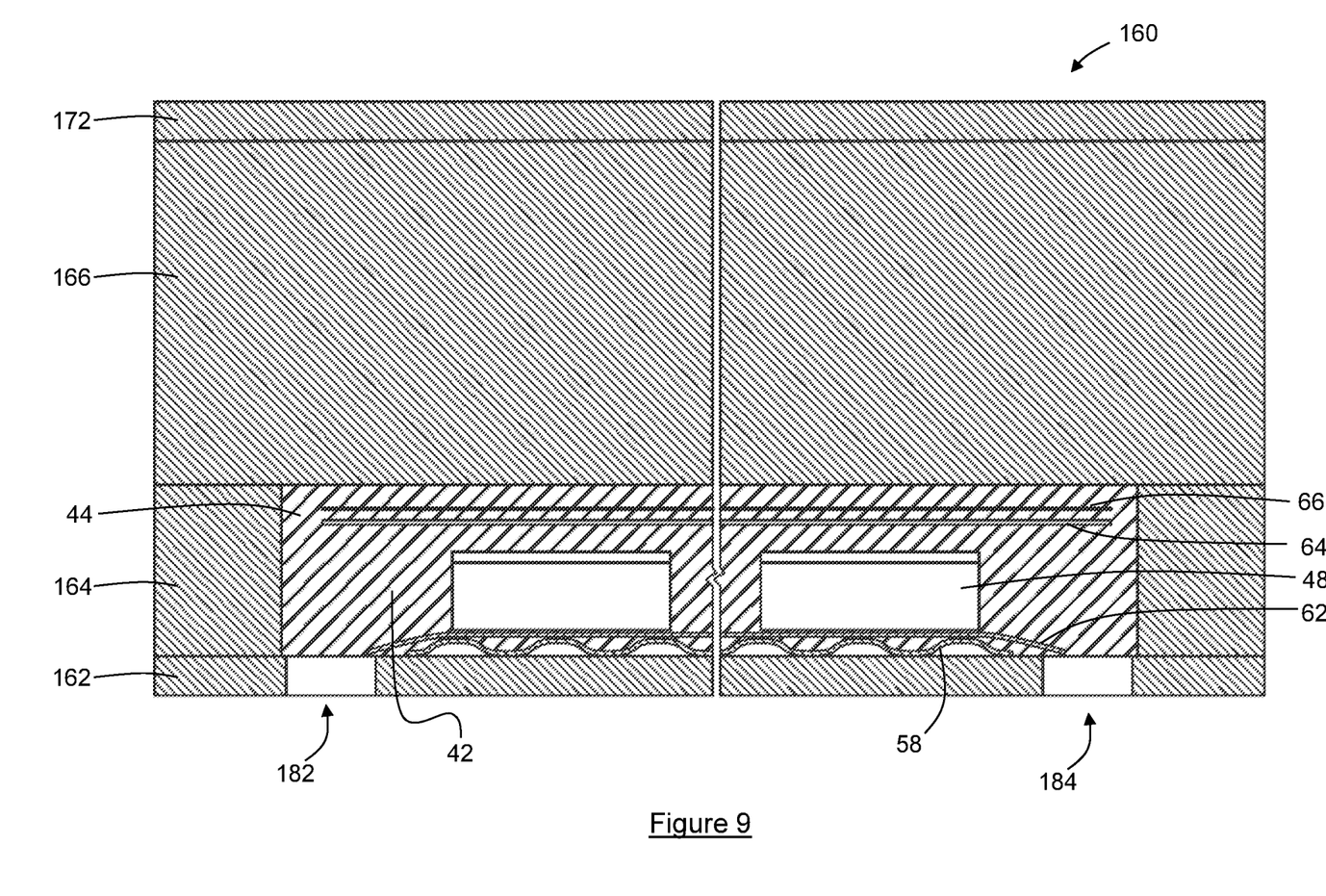
FIG. 9 is a sectional, fragmentary view of the portion of the assembly of FIG. 8 during fabrication of an anchor support, taken along the indicated section line.

During fabrication of the anchor support 30, the assembly 160 is assembled by placing the base spacer frame 164 onto first face plate 162. The textured plate 58 is then disposed on the first face plate 162 and is generally centered within the area bordered by the base spacer frame 164, and the first reinforcement sheet 62 is then disposed on the textured plate 58. The textured plate 58 has non-planar surfaces and is fabricated of a non-ferromagnetic material. As will be understood, the non-planar surfaces of the textured plate 58 provide conduits through which the liquid polymer resin can flow during casting of the flexible body 42, so as to enable the reinforcement sheet 62 and the permanent magnets 48 to be encapsulated. In the embodiment shown, the textured plate 58 has dimpled surfaces, and is fabricated of an aluminum alloy. The permanent magnets 48 are then disposed on the portion of the reinforcement sheet 62 covering the textured plate 58, such that the textured plate 58 is interposed between each of the permanent magnets 48 and the first face plate 162. Each of the permanent magnets 48 is disposed on the reinforcement sheet 62 such that the ferromagnetic disc 74 is oriented away from the first reinforcement sheet 62, as shown in FIGS. 8 and 9. As will be understood, placement of the permanent magnets 48 in this manner causes the permanent magnets 48 to be magnetically attracted to the first face plate 162, through the textured plate 58 and the reinforcement sheet 62. The second reinforcement sheet 64 is then disposed on the permanent magnets 48, and a suitable amount of the material is pulled upward or loosely gathered to form the partial loop 68. Excess portions of the second reinforcement sheet 64 may be trimmed, as necessary, to enable the second reinforcement sheet 64 to fit within the area bordered by the base spacer frame 164. The at least one wire reinforcement grid 66 is then disposed on the second reinforcement sheet 64 around the partial loop 68. In the example shown, two (2) wire reinforcement grids 66 are disposed on either side of the partial loop 68. The tab spacer frame 166 is then placed onto the base spacer frame 164, and the partial loop 68 is fed into the longitudinal slot 168 to generally near the top of the longitudinal slot 168. The second face plate 172 is then placed onto the tab spacer frame 166 to define the mold cavity 180.

The first face plate 162, the base spacer frame 164, the tab spacer frame 166 and the second face plate 172, with the textured plate 58, the first reinforcement sheet 62, the permanent magnets 48, the second reinforcement sheet 64, and the at least one wire reinforcement grid 66 inside, are then removably fastened together using one or more suitable fasteners (not shown). In this embodiment, the fasteners are C-clamps (not shown). Once fastened, the assembly 160 is oriented such that the second aperture 184 is positioned at or near the uppermost portion of the assembly 160. The flexible body 42 is then cast by injecting the liquid polymer resin, which is delivered from a source (not shown) of liquid polymer resin via a suitable conduit (not shown), through the first aperture 182 into the mold cavity 180. Air in the mold cavity displaced by the rising liquid polymer resin is vented through the second aperture 184. The liquid polymer resin fills the mold cavity 180 and encapsulates the first reinforcement sheet 62, the permanent magnets 48, the second reinforcement sheet 64, and the at least one wire reinforcement grid 66, by flowing, in no particular order: around the permanent magnets 48, between the permanent magnets 48 the first reinforcement sheet 62, between the permanent magnets 48 and the second reinforcement sheet 64, between the reinforcement sheet 62 and the textured plate 58, into the longitudinal slot 168 and along all sides of the partial loop 68, and around and through the at least one wire reinforcement grid 66. The liquid polymer resin is then allowed to cure. Once cured, the flexible body 42, which encapsulates the permanent magnets 48, the reinforcement sheets 62 and 64, and the at least one wire grid, is formed. The first face plate 162, the base spacer frame 164, the tab spacer frame 166 and the second face plate 172 are then unfastened, and the flexible body 42 with the textured plate 58 attached thereto are removed. The textured plate 58 is then separated from the flexible body 42 to yield the anchor support 30.

During fabrication of the removable containment boom anchor 24, the connector 32 is fastened to the anchor support 30 by forming boreholes through the tab 46 by a suitable method, such as drilling. Fasteners 188 are then inserted through the boreholes formed in the tab 46 and through the boreholes 86 of the connector 32 and to fasten the connector 32 to the anchor support 30. In the example shown, the fastener is a bolt and nut. At least one handle 34 is optionally fastened to the second face 54 of the flexible body 42 by applying a layer of adhesive to the underside of the handle 34 or to the second face 54 of the anchor support 30, or to both, and then applying suitable pressure for a suitable amount of time to bond the handle 34 to the anchor support 30.

In use, the removable containment boom anchor 24 is applied to a ferrous structure, such that the first face 52 contacts the ferrous structure. The permanent magnets 48 provide a magnetic force of attraction to the ferrous structure. This magnetic force of attraction causes the anchor support 30 to conform to and to become magnetically fastened to the ferrous structure. As will be understood, the flexibility of the anchor support 30 enables the anchor support 30 to conform to any curvature of the ferrous structure. The boom string 22 is then connected to the removable containment boom anchor 24 by slidably and matingly engaging the connector at the end of the boom string 22, which is identical in shape to connector 32, with the connector 32 of the removable containment boom anchor 24. Alternatively, the boom string 22 may be connected to the removable containment boom anchor 24 before magnetically fastening the removable containment boom anchor 24 to the ferrous structure.

The removable containment boom anchor 24 may be removed by pulling the handle 34 away from the ferrous structure, and with sufficient force to overcome the magnetic force of attraction provided by the permanent magnets 48. Alternatively, the removable containment boom anchor 24 may be removed by pulling an edge of the anchor support 30 away from the ferrous structure, and with sufficient force to overcome the magnetic force of attraction provided by the permanent magnets 48.

As will be appreciated, the anchor support 30 of the removable containment boom anchor 24 has a generally simple construction and consists of generally only five (5) components, namely the flexible body 42, the plurality of permanent magnets 48, the reinforcement sheets 62 and 64, and the wire reinforcement grid 66. The simple construction advantageously allows the anchor support 30, and in turn the removable containment boom anchor 24, to be manufactured at lower cost as compared to conventional removable containment boom anchors having more complex construction.

As will be appreciated, the anchor support 30, which is formed by a single casting during which the permanent magnets 48 are encapsulated, has a single, unitary structure, and therefore lacks a seam surface or weld surface that would otherwise be present in conventional removable containment boom anchors comprising flexible bodies that are fabricated by more than one (1) casting and that comprise multiple layers. As will be understood, the single, unitary structure of the anchor support 30 improves the structural integrity of the removable containment boom anchor 24, as compared to conventional removable containment boom anchors comprising multiple layers.

As will be appreciated, the second reinforcement sheet 64, which is a single element, provides internal reinforcement to both the base 44 and the tab 46 of the anchor support 30. As will be understood, this advantageously allows tensile forces exerted upon the tab 46 during operation to be distributed to the base 44. This configuration improves the structural integrity of the removable containment boom anchor 24, as compared to conventional removable containment boom anchors constructed without such reinforcement.

As will be appreciated, the permanent magnets 48 fabricated of rare earth alloy advantageously provide a stronger magnetic force of attraction as compared to permanent magnets fabricated of other materials, such as for example ferrous permanent magnets. As will be understood, the stronger magnetic force of attraction provided by the permanent magnets 48 enables the anchor support 30 to become more strongly magnetically fastened to the ruptured ferrous structure, and to thereby withstand greater tensile forces upon the removable containment boom anchor 24, as compared to conventional removable containment boom anchors comprising ferrous permanent magnets.

As will be appreciated, the permanent magnets 48 allow the removable containment boom anchor 24 to be magnetically fastened to the ferrous structure in a facile manner, and without the need to provide an electrical current and means for delivering such a current, as would be required for conventional removable containment boom anchors comprising electromagnets. The permanent magnets 48 advantageously enable the removable containment boom anchor 24 to be fastened quickly, which is particularly beneficial for emergency situations such as oil spills.

Other configurations are possible. For example, the anchor support 30 may alternatively have an embedded handle in the shape of a loop formed at one or more corners, and/or at one or more sides thereof. The embedded handle may comprise a component integrated into the anchor support during fabrication, and which either protrudes from the anchor support or is accessible from the surface of the anchor support.

Although in the embodiment described above, the anchor support 30 comprises a textured surface 56 that is formed by casting the liquid polymer resin against a textured plate 58, in other embodiments, the textured surface 56 may alternatively be formed by casting the liquid polymer resin against any surface having a non-planar topography, so as to create a textured surface having a non-planar topography. In one such embodiment, the surface having the non-planar topography may be, for example, a plate having a one or more of a grooved surface, a ridged surface, a dimpled surface, a perforated surface, a scored surface, and the like. As will be understood, the non-planar topography may comprise a patterned topography or a non-patterned topography.

Although in the embodiment described above, the permanent magnet 44 comprises a ferromagnetic disc 74 that is magnetically fastened to the magnet body 72, in other embodiments, two or more of the magnet bodies 72 may alternatively be magnetically fastened to a single ferromagnetic plate fabricated of a ferromagnetic material. In one such embodiment, the single ferromagnetic plate may be a steel sheet, a steel plate, and the like, to which the plurality of magnet bodies 72 are magnetically fastened.

Although in the embodiment described above, the reinforcement sheets are fabricated of fiberglass cloth, in other embodiments, one or both reinforcement sheets may alternatively be fabricated of any flexible, resilient material, such as Kevlar fabric, Kevlar mesh, or a resilient fabric or a resilient mesh fabricated of one or more materials having adequate strength to provide reinforcement to the removable containment boom anchor 24.

Although embodiments have been described above with reference to the accompanying drawings, those of skill in the art will appreciate that variations and modifications may be made without departing from the scope thereof as defined by the appended claims.

What is claimed is:

1. A removable containment boom anchor, comprising:
   an anchor support comprising a flexible body fabricated of at least one resilient material, the flexible body having a base and a tab extending upwards from the base, the flexible body encapsulating a plurality of permanent magnets; and
   a containment boom connector fastened to the anchor support,
   wherein the permanent magnets are disposed within the base, and
   first and second reinforcement sheets encapsulated within the flexible body, the first reinforcement sheet being disposed between the plurality of permanent magnets and a first face of the base, the second reinforcement sheet being disposed between the plurality of permanent magnets and a second face of the base, the second reinforcement sheet extending from the base into the tab,
   wherein the second reinforcement sheet comprises a partial loop that extends upwards within the height of the tab,
   wherein the containment boom is configured to float and contain a spill of floating pollutant.

2. The removable containment boom anchor of claim 1, wherein the containment boom connector is fastened to the tab.

3. The removable containment boom anchor of claim 1, wherein the flexible body has a single, unitary structure.

4. The removable containment boom anchor of claim 1, wherein the flexible body is formed by a single casting.

5. The removable containment boom anchor of claim 1, wherein one or both of the first and second reinforcement sheets are selected from the group consisting of fiberglass cloth, Kevlar cloth, Kevlar mesh, and a resilient fabric or a resilient mesh fabricated of one or more other materials.

6. The removable containment boom anchor of claim 1, further comprising at least one reinforcement grid encapsulated within the flexible body.

7. The removable containment boom anchor of claim 6, wherein the at least one reinforcement grid comprises a wire mesh.

8. The removable containment boom anchor of claim 1, further comprising a handle fastened to the anchor support.

9. The removable containment boom anchor of claim 1, wherein the flexible body has a face comprising a textured surface.

10. The removable containment boom anchor of claim 9, wherein the textured surface has a non-planar topography.

11. The removable containment boom anchor of claim 1, wherein the plurality of permanent magnets comprises one or more rare earth magnets.

12. The removable containment boom anchor of claim 1, wherein each of the permanent magnets comprises an epoxy coating.

13. The removable containment boom anchor of claim 1, wherein each of the permanent magnets comprises a magnet body and ferromagnetic plate.

14. The removable containment boom anchor of claim 13, wherein the ferromagnetic plate is a steel disc.

15. The removable containment boom anchor of claim 1, wherein the at least one resilient material comprises a polymer.

16. A removable containment boom anchor, comprising:
an anchor support comprising a flexible body fabricated of at least one resilient material, the flexible body having a base and a tab extending upwards from the base, the flexible body encapsulating a plurality of permanent magnets; and
a containment boom connector fastened to the anchor support,
wherein the permanent magnets are disposed within the base, and
first and second reinforcement sheets encapsulated within the flexible body, the first reinforcement sheet being disposed between the plurality of permanent magnets and a first face of the base, the second reinforcement sheet being disposed between the plurality of permanent magnets and a second face of the base, the second reinforcement sheet extending from the base into the tab,
wherein the second reinforcement sheet comprises a partial loop that extends upwards within the height of the tab,
wherein one or both of the first and second reinforcement sheets are selected from the group consisting of fiberglass cloth, Kevlar cloth, Kevlar mesh, and a resilient fabric or a resilient mesh fabricated of one or more other materials, wherein the containment boom is configured to float and contain a spill of floating pollutant.

17. A removable containment boom anchor, comprising:
an anchor support comprising a flexible body fabricated of at least one resilient material, the flexible body having a base and a tab extending upwards from the base, the flexible body encapsulating a plurality of permanent magnets; and
a containment boom connector fastened to the anchor support,
wherein the permanent magnets are disposed within the base;
first and second reinforcement sheets encapsulated within the flexible body, the first reinforcement sheet being disposed between the plurality of permanent magnets and a first face of the base, the second reinforcement sheet being disposed between the plurality of permanent magnets and a second face of the base, the second reinforcement sheet extending from the base into the tab;
wherein the second reinforcement sheet comprises a partial loop that extends upwards within the height of the tab, and
at least one reinforcement grid encapsulated within the flexible body, wherein the at least one reinforcement grid comprises a wire mesh, wherein the containment boom is configured to float and contain a spill of floating pollutant.

* * * * *